Aug. 19, 1952 T. S. SKILLMAN 2,607,860

FREQUENCY SELECTIVE REPEATER DEVICE

Filed Aug. 9, 1945 2 SHEETS—SHEET 1

Inventor:
Thomas S. Skillman.
By Ward, Crosby & Neal
Attorneys.

Inventor:
Thomas Samuel Skillman
by his Attorneys
Howson & Howson

Patented Aug. 19, 1952 2,607,860

UNITED STATES PATENT OFFICE 2,607,860

FREQUENCY SELECTIVE REPEATER DEVICE

Thomas Samuel Skillman, Mosman, near Sydney, New South Wales, Australia, assignor to Punch Engineering Pty. Limited, Cammeray, near Sydney, Australia, a company of New South Wales Application August 9, 1945, Serial No. 609,885
In Australia July 12, 1944

Section 1, Public Law 690, August 8, 1946
Patent expires July 12, 1964

6 Claims. (Cl. 179—170)

Figure 1:
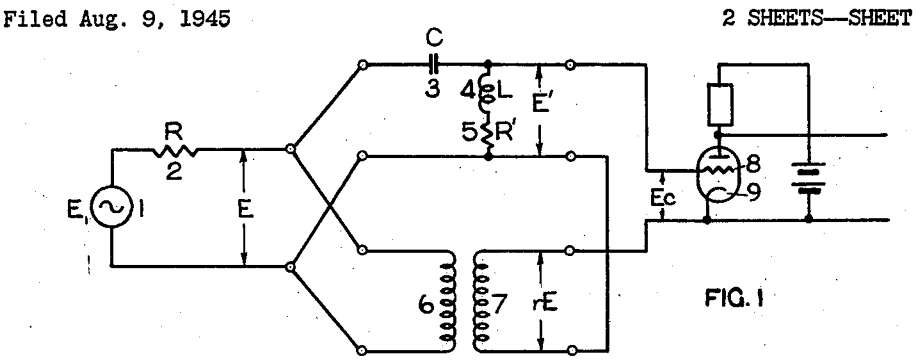

This invention relates to frequency selecting devices.

An object of the invention is to provide a new and improved method of obtaining selective attenuation or amplification of electrical currents of different frequencies.

The invention broadly consists in the provision of two or more transmission paths to which electrical currents of various frequencies are simultaneously applied, the out-put of said two or more transmission paths being applied simultaneously to a common circuit, the attenuation and phase shift of said paths being so chosen that the frequency selective effect is obtained owing to the partial or entire opposition of the phases of the currents at certain frequencies in the output of said paths.

Hitherto in designing frequency selective devices, it has been necessary to take into consideration the interaction between the input and the output as well as the phase shift throughout the network and design the equipment accordingly. By this invention a plurality of paths having different attenuations and different phase shifts are used and the output thereof combined without interaction thereby simplifying the design and the equipment required.

A feature of the invention is the use of a high impedance circuit such as the input circuit in a thermionic device for combining these outputs.

One application of the invention will be described as an exemplification of the method. This is its application to obtain a frequency selective path giving increased amplification for one part of the range, thereby acting as an equalising device and giving attenuation over another part of the range to act as a filtering device. By applying the invention to this particular case it has been found possible to obtain both a filter and an equaliser effect, using only a simple resonance circuit for one of the two paths and a transformer for the other of the two paths. The invention thus permits a whole group of condensers and coils forming an equaliser together with another whole group of condensers and coils forming a filter to be replaced by a very much simpler and cheaper circuit. This particular application of the invention is adapted for use on repeaters on multi-channel telephone systems. On such systems it is customary to associate with the amplifiers, groups of high pass and low pass filters whereby a two wire line can be used for transmission in both directions without singing of the amplifiers being produced. The design of the high pass and low pass filters is in such cases a compromise between the need to obtain as much as possible of the total frequency spectrum available for actual transmission, and the need to obtain a very high attenuation in the crossover region between the high pass and low pass filter. The latter requirement makes it necessary to use a rather large number of filter sections and consequently encroaches upon the useful band because the attenuation rises rather rapidly as the frequency of cut-off of the filter is reached. This invention provides means whereby the amplifier increases in gain in much the same way as the filter increases in loss and is then suddenly cut-off at about the cut-off point of the filter. The said means permits of fewer filter sections being used and also permits of the easy compensation for the loss in the pass range of such sections as are necessary.

Figures 2A, 2B, 2C:
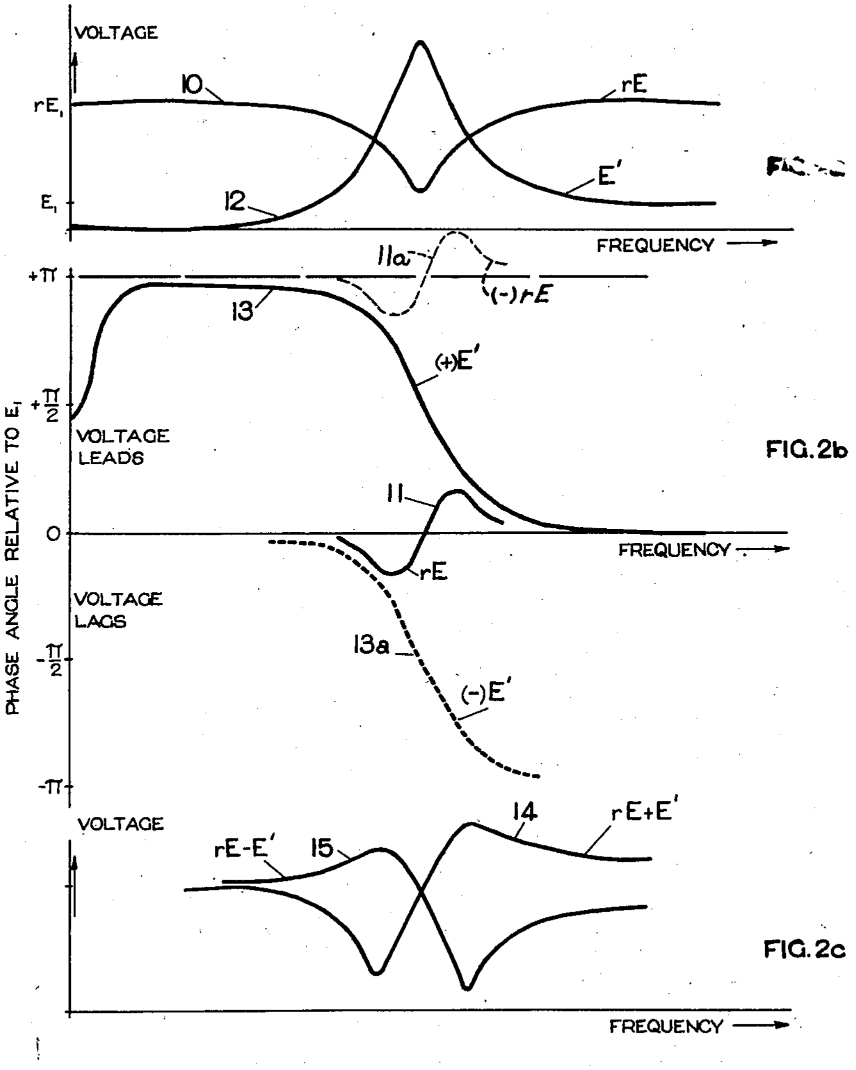
Figure 3:
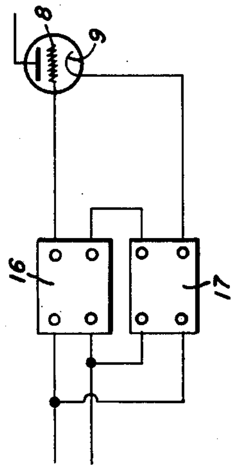

The circuit used in this application of the invention is shown in Fig. 1. Fig. 2*a* shows the voltage relationship betwen the two paths shown in Fig. 1, Fig. 2*b* shows the phase relationship between the two paths shown in Fig. 1, and Fig. 2*c* shows the output voltages for two embodiments of the circuit. Fig. 3 is an explanatory diagram illustrating the principle used in this particular application of the invention.

Figure 4:
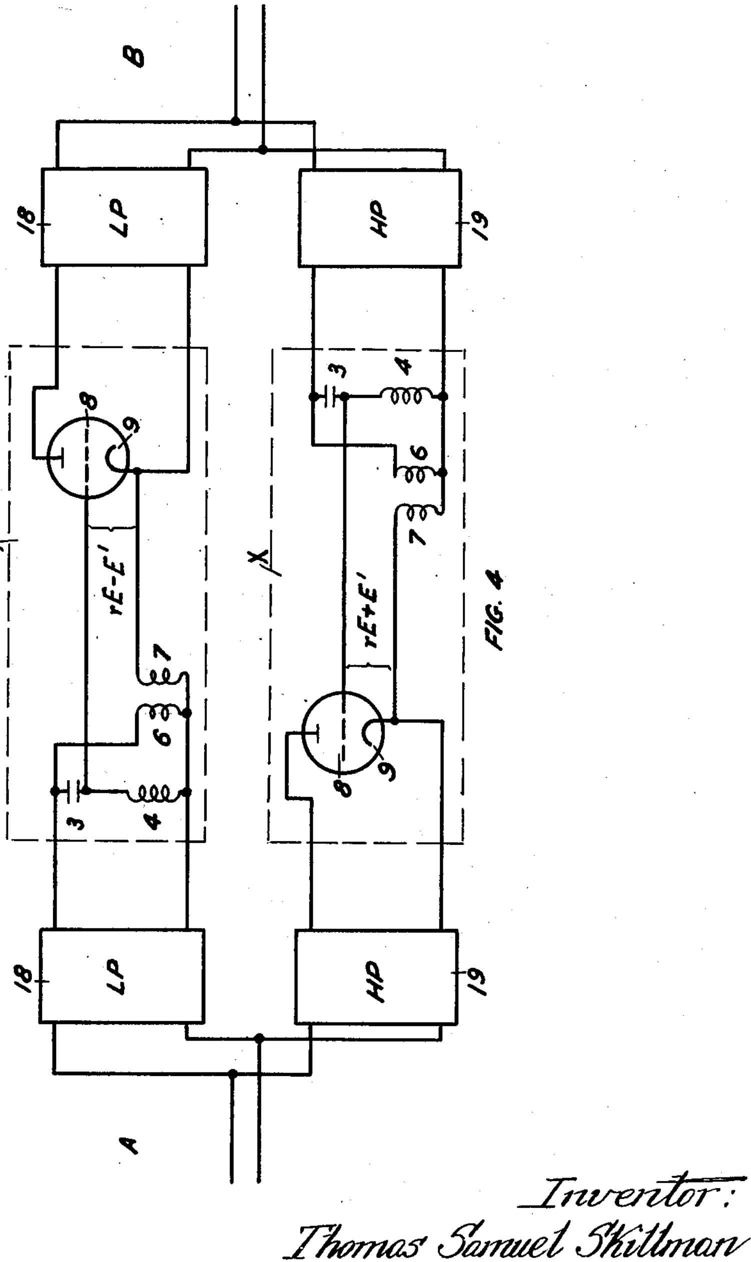

Fig. 4 shows a circuit using two amplifiers.

Consider first Fig. 3, 16 and 17 represent two paths consisting of circuit elements designed to give a certain required voltage and phase characteristics at their output. Current is fed to the input of both paths and the output of the two paths are connected in series between the grid 8 and the cathode 9 of a vacuum tube.

Referring to Fig. 1 an input voltage $E_1$ is applied to an input transformer 6, 7, by way of an impedance 2. Bridged across the input circuit is a resonant circuit consisting of a condenser 3 and an inductance 4. The condenser and inductance form an unbalanced half section ladder network in which the condenser is in a series arm between one input and one output terminal and in which the inductance is in a shunt arm between the output terminals of the network. The resistive component of the inductance is represented by the resistance 5. The voltage transformation ratio of the transformer is represented by $r$, so if the voltage applied across the resonant circuit and the primary of the transformer is E then the voltage applied between the grid 8 and the cathode 9 of the valve is represented by $Ec = rE \pm E^1$ where $E^1$ is the voltage appearing across the coil 4, 5.

If we write $$\frac{\omega}{2\pi}$$

as the frequency;

$$\frac{\omega_0}{2\pi}$$

as the resonant frequency of L and C; $R_T=R+R'$;

$$a=1-\frac{\omega_0^2}{\omega^2}$$

and $$Q=\frac{\omega_0 L}{R^1}$$

then by straightforward circuit calculations the following formulae for $$r\frac{E}{E_1}$$

and for $$\frac{E'}{E_1}$$

result, namely $$\frac{rE}{E_1}=\left|\frac{r\sqrt{(R'R_T+\omega^2L^2a^2)^2+(\omega LaR)^2}}{R_T^2+\omega^2L^2a^2}\right|\left|\tan^{-1}\frac{\omega LaR}{R'R_T+\omega^2L^2a^2}\right.$$

and $$\frac{E^1}{E_1}=\left|\frac{\sqrt{(R^1R_T+\omega^2L^2a)^2+(\omega LR_T-\omega LaR^1)^2}}{R_T^2+\omega^2L^2a^2}\right|\left|\tan^{-1}\frac{\omega LR_T-\omega LaR^1}{R^1R_T+\omega^2L^2a}\right.$$

If now we make L such that $\omega_0$L is large compared with R, then away from resonance the effect of the bridging resonance circuit upon E may be neglected and E becomes equal to $E_1$, while E′ is approximately zero. Also, if we make R′ small compared with R, the bridging resonant circuit at resonance has a very large effect upon E, both as regards phase and magnitude. As a typical example, we may take Q=100 and $$R=\frac{\omega_0 L}{10}$$

R′ then becomes equal to $$\frac{R}{10}$$

The above expression for *r*E may then be represented by the curves 10 and 11 of Figs. 2*a* and 2*b*, where 10 is the magnitude and 11 is the phase.

It will be seen that a rapid change of phase takes place close to resonance, owing to the fact that below resonance the bridging circuit acts as a condenser and above resonance it acts as an inductance. Similarly the above expression for E¹ may be represented by curves 12 and 13 of Figs. 2*a* and 2*b*, 12 representing the magnitude and 13 the phase.

If the connections of the output terminals of one path are reversed with respect to the output terminals of the other path, the effect is to shift the phase of E′ by 180° with respect to *r*E. If, for example, the output terminals of the resonant circuit path are reversed, the phase of the output voltage, (—)E′, may be represented by the dotted curve 13*a* shown in Fig. 2*b*. Similarly, if the output terminals of the transformer path are reversed, the phase of the output voltage, (—)*r*E, may be represented by the dotted curve 11*a* also shown in Fig. 2*b*.

The voltage applied to the grid in the above case is represented by the curves 14 and 15, covering the cases where the two voltages are aiding and opposing respectively. Curve 14 shows the results of adding curves 10 and 12 of Fig. 2*a* in accordance with the phases determined from curves 11 and 13 in Fig. 2*b*, and curve 15 shows the results of adding curves 10 and 12 of Fig. 2*a* in accordance with the phases determined from curves 11 and 13*a* or 11*a* and 13 in Fig. 2*b*. It will be seen that just below resonant frequency a situation occurs in which the phase of the two voltages *r*E and E¹— are nearly 180° apart and there is thus in the case of aiding connections a substantial reduction in the magnitude of the voltage applied to the grid. On the opposite side of resonance there is no such phase difference and consequently as the voltage *r*E drops the voltage E¹ compensates for this and by suitably proportioning the value of E¹ at resonance in relation to *r*E it is possible to get any desired degree of rise in characteristic in the range approaching the resonance point. The fact that the voltage does not drop to zero on the other side of the resonance but only diminishes is not important for the purposes for which this invention is applied since a supplementary filter section can be added which uses a cut-off slightly higher than the resonance frequency of the simple resonance circuit shown in Fig. 1. This filter will thus begin to cut off at about the point where the minimum in the voltage curve in Fig. 2*c* is reached and this can be done without causing any very serious addition to the losses in the pass range which will commence, of course from a value slightly on the other side of the resonance frequency of the resonance circuit. Similarly, in the case of opposing connections shown by curve 15, the phases are shown by curves 11 and 13*a*, the latter the result of the opposing connections. The voltages are nearly in phase at frequencies below resonance, and nearly cancel at a frequency just above resonance.

Referring to Fig. 4, it will be clear that the invention may be applied to two amplifiers X and Y, one X in which the two voltages E′ and *r*E are aiding and one Y in which they are opposing, to produce the effect of a high pass-low pass filter pair. Due to the aiding connection of the coils 6 and 7, the amplifier X in the direction B to A has high pass characteristics as seen by reference to curve 14 of Fig. 2*c*. Again due to the opposing connection of the coils 6 and 7 in amplifier Y this has low pass characteristics as seen by reference to curve 15 of Fig. 2*c*. The suppression in the range where the gain returns (for example, above the minimum voltage point of curve 14) is then provided as indicated above by supplementary low pass filters 18 of a normal pattern. Again supplementary high pass filters 19 of a normal pattern provide the suppression below the minimum voltage point of curve 15. This is particularly useful when the invention is applied to a two-way telephone repeater which amplifies one frequency band in one direction and the other frequency band in the other direction.

In such telephone repeaters one of the major technical difficulties is to secure sufficient attenuation in the range between the two transmission bands to prevent the repeater singing and an appreciable part of the useful transmission range of the line has to be sacrificed for the change over band. The present invention not only permits sharper filters to be used by overcoming the resultant loss in the pass range, but the sharp peak of attenuation shown in Fig. 2c can be made to supplement the filter attenuation, by proper choice of the constants as indicated above, precisely at this critical cross over point.

It will be clear that the rise in characteristic shown in curves 14 and 15 may equally well be a drop by suitably proportioning the voltage fed through the two paths represented by $E^1$ and $rE$ or could be any other kind of rise or fall desired to equalise the line as well as to equalise the low pass filter. Thus in the case of the repeater mentioned above a suitable proportioning of the two voltages permits an accurate equalisation for the losses of the high pass and low pass filters in the pass range near the cut off.

It will be clear also that in place of the simple resonance circuits shown for producing the second voltage $E^1$ any other more complicated combination of circuit elements may be used so that other phase changes of a more complicated nature may be produced in the voltage $E^1$. For example, if the circuit L. C. Fig. 1, were replaced by a phase changing circuit such that the phases were in opposition over one part of the frequency range and in addition during another part of the frequency range and then at a still further part of the frequency range again in opposition then a band pass filter effect would be obtained from the amplifier. The design of net-work to give such phase changes is well known in the art and the invention thus permits almost any kind of filter characteristic to be obtainable in an amplifier by considering only the design of suitable phase changing network and arranging that the two paths have the correct relative phase shift to give opposing and adding voltages in the pass and non pass range.

I claim:

1. Arrangement for obtaining selective attenuation or amplification of electrical currents within a single continuous range of frequencies when said arrangement is connected between a load circuit of negligible admittance and a driving circuit of finite internal impedance and admittance, said arrangement comprising two independent transmission paths, each path having a pair of terminals at the input or sending end and a pair of terminals at the output or receiving end, the input terminals of said paths being connected in parallel and to said driving circuit and the output terminals of said paths being connected in series with each other to said load circuit, one of said transmission paths consisting of an unbalanced halfsection ladder network with a series condenser arm between one of said input terminals and one of said output terminals and a shunt inductance arm between said pair of output terminals, said inductance having an appreciable series resistance, and the other of said transmission paths comprising a step-up transformer having primary and secondary windings, said primary winding being connected to the input terminals of said other path and said secondary winding being connected to the output terminals of said other path, the series combination of said condenser and said inductance being tuned to a predetermined frequency and said arrangement presenting a characteristic showing of peak of gain to one side of said predetermined frequency and a peak of attenuation to the other side of said predetermined frequency, the sharpness of said peaks being determined by the ratio of the values of said condenser and said inductance, the magnitude of said peaks being determined by the step-up ratio of said transformer and the disposition of either of said peaks to the high frequency or low frequency side of said predetermined frequency being determined by the phase connections of said output circuits whereby said network acts as an equalizer on one side of said predetermined frequency and as a filter providing attenuation on the other side of said frequency.

2. A network for providing a transmission characteristic varying with frequency when said network is connected between firstly a load circuit of negligible admittance and secondly a driving circuit with finite internal impedance and admittance, said network consisting of two independent transmission paths, each path having a pair of terminals at the input or sending end and a pair of terminals at the output or receiving end, the input terminals of said paths being connected in parallel and to said driving circuit and the output terminals of said paths being connected in series and in series with said load circuit, one of said paths comprising an unbalanced halfsection ladder network with a series condenser arm between one of said input terminals and one of said output terminals and a shunt inductance arm between said pair of output terminals, said inductance having an appreciable series resistance, and the other of said paths comprising a step-up transformer having primary and secondary windings, said primary winding being connected to said driving circuit parallel to said input terminals of said ladder network, and said secondary winding being connected in series with said inductance and in series with said load circuit.

3. Means for obtaining amplification within a selected frequency range from a driving circuit having a series impedance and an electromotive force $E_1$, said means comprising an amplifier and a frequency selective network preceding said amplifier, said network comprising two transmission paths connected to said driving circuit, the input circuits of said paths being connected in parallel, the output circuits of said paths being connected in series and having output voltages $rE$ and $E'$ respectively, said voltages being applied in series to a common circuit of said amplifier, the admittance of said common circuit being substantially zero to avoid interaction between the output circuits of said paths, and said paths containing elements having predetermined attenuations and phase shifts so chosen that at a predetermined frequency at which the maximum selective effect is to be obtained the amplitudes of $$\frac{rE}{E_1} \text{ and } \frac{E'}{E_1}$$

are approximately equal; and the difference between the phase angles thereof is approximately 180 degrees.

4. Means for obtaining amplification within a selected frequency range in one direction of a line comprising an amplifier connected in said line between an input and an output filter passing the required frequency range and a frequency selective network preceding said amplifier, said network comprising two transmission paths to which currents received from the line are applied, the input circuits of said paths being connected in parallel, the output circuits of said paths being connected in series and applied to a common circuit of said amplifier, the admittance of said common circuit being substantially zero to avoid interaction between the output circuits of said paths, and said paths containing elements having predetermined attenuations and phase shifts so chosen as to minimise over said pass range the difference between the attenuation of said filters and the amplitude of the vector sum of $$\frac{rE}{E_1} \text{ and } \frac{E'}{E_1}$$

where $rE$ represents the output voltage of one of said paths, $E'$ the output voltage of the other of said paths, and $E_1$ the electromotive force driving said network through a series impedance equal to the impedance presented at the output side of said input filter.

5. Means for obtaining amplification within a selected frequency range in one direction of a line and amplification in another frequency range in the opposite direction of said line, said means comprising two amplifiers connected together by input and output filters respectively passing the required ranges and forming a two-directional repeater; and preceding each of said amplifiers a frequency selective network comprising two transmission paths to which currents received from the line are applied, the input circuits of said paths being connected in parallel, the output circuits of said paths being connected in series and applied to a common circuit of the corresponding amplifier, the admittance of said common circuit being substantially zero to avoid interaction between the output circuits of said paths, and said paths containing elements having predetermined attenuations and phase shifts so chosen as to minimise over each pass range the difference between the attenuation of the corresponding filters and the amplitude of the vector sum of $$\frac{rE}{E_1} \text{ and } \frac{E'}{E_1}$$

where $rE$ represents the output voltage of one of said paths, $E'$ the output voltage of the other of said paths and $E_1$ the electromotive force driving said network through series impedance equal to the impedance presented at the output side of said input filter.

6. Means for obtaining amplification within a selected frequency range in one direction of a line and amplification in another frequency range in the opposite direction of said line, said means comprising two amplifiers connected together by input and output filters respectively passing the required ranges and forming a two-directional repeater; and preceding each of said amplifiers a frequency selective network comprising two transmission paths to which currents received from the line are applied, the input circuits of said paths being connected in parallel, the output circuits of said paths being connected in series, said paths having output voltages $rE$ and $E'$ respectively, when driven from a source of electromotive force $E_1$ through a series impedance equal to the impedance presented at the output side of said input filters, said output voltages being applied in series to a common circuit of the corresponding amplifier, the admittance of said common circuit being substantially zero to avoid interaction between the output circuits of said paths, and said paths containing elements having predetermined attenuations and phase shifts so chosen that at a predetermined frequency at which the maximum selective effect is to be obtained the amplitudes of $$\frac{rE}{E_1} \text{ and } \frac{E'}{E_1}$$

are approximately equal and the difference between the phase angles thereof is approximately 180 degrees, said predetermined frequency being located in the cross-over region of said input and output filters.

THOMAS SAMUEL SKILLMAN.

REFERENCES CITED

The following references are of record in the file of this patent:

UNITED STATES PATENTS

| Number | Name | Date |
|---|---|---|
| 1,739,668 | Green | Dec. 17, 1929 |
| 2,067,444 | Gewertz | Jan. 12, 1937 |
| 2,076,248 | Norton | Apr. 6, 1937 |
| 2,115,138 | Darlington | Apr. 26, 1938 |
| 2,127,201 | Bobis | Aug. 16, 1938 |
| 2,288,600 | Arndt | July 7, 1942 |
| 2,301,245 | Bode | Nov. 10, 1942 |
| 2,397,772 | Badmaieff | Apr. 2, 1946 |
| 2,488,417 | Lee | Nov. 15, 1949 |

FOREIGN PATENTS

| Number | Country | Date |
|---|---|---|
| 702,534 | Germany | Feb. 10, 1941 |